Nov. 4, 1930. W. G. ROGERS 1,780,799
HILLSIDE TRACTOR
Filed Sept. 23, 1929 2 Sheets-Sheet 1
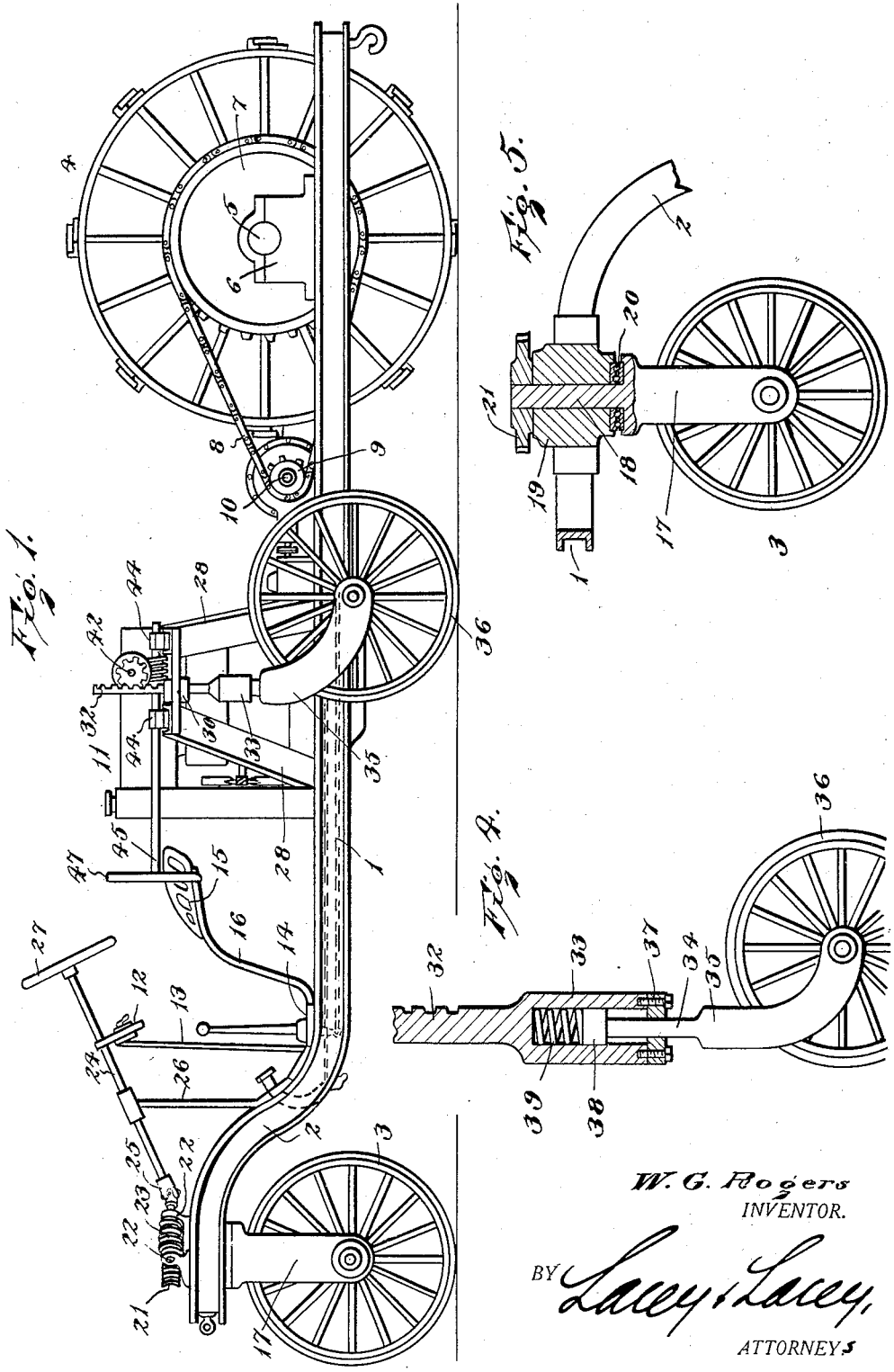
W. G. Rogers
INVENTOR.
BY Lacey & Lacey,
ATTORNEYS

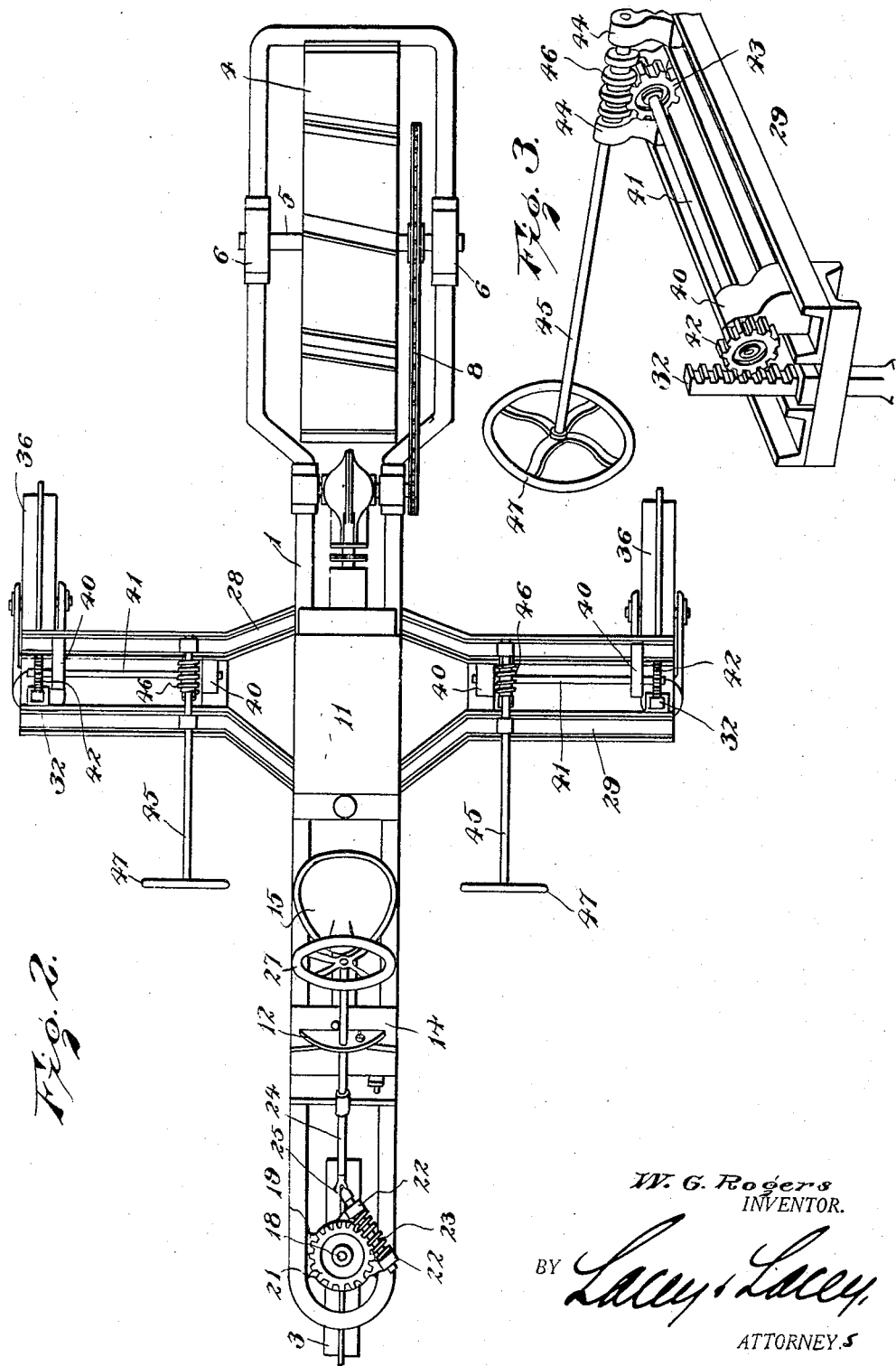

Patented Nov. 4, 1930

1,780,799

UNITED STATES PATENT OFFICE

WALTER G. ROGERS, OF LEAVENWORTH, KANSAS

HILLSIDE TRACTOR

Application filed September 23, 1929. Serial No. 394,563.

This invention has for its object the provision of a tractor which will be especially adapted for operating upon a hillside and which, while strong, durable and efficient, may be poduced at a low cost. The invention is illustrated in the accompanying drawings and consists in certain novel features which will be first fully described and then more particularly defined in the appended claims.

In the drawings:

Figure 1 is a side elevation of a tractor embodying the present invention,

Fig. 2 is a plan view of the same,

Fig. 3 is a detail perspective view of the means for effecting vertical adjustment of a side wheel, Fig. 4 is a detail sectional elevation of the mounting of a side wheel, and Fig. 5 is a sectional elevation of the mounting of the front steering wheel.

In carrying out the invention, there is provided a main frame or chassis 1 which is preferably constructed of channel bars and is in the form of a rather narrow elongated open frame having its side portions carried upwardly adjacent its front end, as shown at 2, whereby to form an arch above the front steering wheel 3 and accommodate the relative angular movements of said wheel. The frame is supported by said front steering wheel 3 and by a single wheel 4 which is disposed at the rear end of the frame, said rear end being widened somewhat relative to the main portion of the frame so as to accommodate the wheel. The driving wheel 4 is disposed on the medial longitudinal line of the frame and it has substantial width so as to firmly support the frame, being carried by an axle 5 which is journaled in bearings 6 secured upon the upper sides of the frame, as clearly shown. At one side of the driving wheel 4, a sprocket gear 7 is secured upon the axle 5 and a sprocket chain 8 is trained about said sprocket gear and a sprocket pinion 9 which is secured on one end of a shaft 10 mounted in suitable bearings upon the frame and extending transversely of the frame. A motor 11 which will preferably be an internal combustion engine and is illustrated in a conventional manner only is mounted upon the frame approximately midway the length thereof and is connected by suitable gearing with the shaft 10 so that power will be imparted to the rear axle to propel the machine. The motor may be controlled through devices mounted upon an instrument board 12 supported by posts or other suitable elements, indicated at 13, rising from the foot boards 14 secured upon the frame at the base of the upwardly projected portion 2. An operator's seat 15 is carried by a standard 16 rising from said foot boards.

The front steering wheel 3 is mounted in the lower end of a yoke or fork 17 which has a spindle 18 rising centrally from its upper end, and this spindle is journaled in a block 19 carried by the chassis adjacent the front end thereof. Anti-friction bearings 20 are fitted between the under side of the block 19 and the top of the yoke or fork 17 to insure easy turning of the steering wheel and to the upper extremity of the spindle 18 is secured a worm gear 21. The block 19 is constructed with bearing lugs or ears 22 which are spaced apart on a line tangential to the worm gear 21 and disposed obliquely with respect to the chassis. Fitted in the bearing lugs 22 is a worm shaft 23 meshing with the worm gear 21 and having its inner end connected with a steering rod 24 by a universal joint 25. The steering rod 24 is mounted in the upper end of a post or other support 26 rising from the foot boards 14 and at the rear end of the steering rod is secured a hand wheel 27 whereby the rod may be manipulated in a well-known manner. If the hand wheel 27 and the rod 24 be rotated, the motion will be transmitted through the worm gearing to the spindle 18 so that the steering wheel 3 will be set at an angle to the chassis and the tractor thereby caused to turn to one or the other side. The worm gearing serves as a brake or lock to aid in holding the steering wheel in the angle in which it may be set and also transmits the motion of the hand wheel easily to the steering wheel so that the labor of steering the tractor will be minimized. It will be noted that the hand wheel is so located that it may be easily handled by an operator upon the seat 15, and it will be understood, of course, that a foot-operated brake may be provided and the usual gear-shifting mechanism may also be provided so that the tractor may be driven at various speeds or reversed in a well-known manner.

Connected firmly with the chassis or main frame and extending across the same to aid in supporting the motor is a transverse frame 28 which is composed of channel bars having their intermediate portions disposed obliquely so as to extend upwardly and outwardly from the chassis and thereby bring their end portions 29 into planes above the horizontal plane of the chassis. At each outer end of the cross frame is provided a guide 30 through which extends a vertically disposed rack bar 32 extending from the upper end of a socket member 33 in which is slidably mounted a spindle 34 which at its lower end merges into a yoke or fork 35 carrying a caster wheel 36. Upon reference to Fig. 4, it will be noted that the spindle 34 is of circular cross section so that it may easily rotate in the cap plate 37 which is secured across the lower end of the socket 33 and on the uper end of the spindle is a head or enlargement 38 between which and the end wall of the socket is an expansion spring 39 which serves as a shock absorber to permit the caster wheel to ride over inequalities in the surface of the ground without any tendency to break or to cause breakage of any other part. The cap plate 37 extends entirely across the lower end of the socket 33 so as to close the same and constitutes an abutment in the path of the head or enlargement 38 to prevent the same dropping from the socket. Bearings 40 are provided upon the top of the end members 29 and a shaft 41 is journaled in these bearings, said shaft having a pinion 42 at its outer end meshing with the adjacent rack 32 and being provided at its inner end with a pinion 43. Other bearings 44 are provided upon the members 29 of the cross frame and an operating shaft 45 has its rear portion journaled in these bearings and equipped with a worm 46 between them, the front end of the shaft being provided with a hand wheel 47 which may be easily reached by the operator upon the seat 15. The shaft 45 with its hand wheel 47 and the gearing cooperating therewith are duplicated at the two ends of the cross frame so that there will be a caster wheel 36 at each side of the chassis or main frame and spaced laterally therefrom. The caster wheels will trail and will turn freely upon their swiveled mounting of the heads 38 within the respective sockets 33 and they are independently vertically adjustable by means of the respective shafts 45. By turning either shaft 45, the shaft 41 geared thereto will be also rotated and the pinion 42 thereon will be, consequently, caused to cooperate with the rack 32 to effect vertical movement of the latter and thereby raise or lower the connected caster wheel. By raising one caster wheel and lowering the other, the tractor will be adjusted to run evenly upon a hillside and will be maintained upon a level even though it is mainly supported by only two wheels, one at the front and one at the rear.

My improved tractor is obviously composed of few parts which are simple in their construction and arrangement and are, therefore, not apt to get out of order. While the machine is designed primarily for use upon a hillside, it may, nevertheless, be advantageously employed upon a level surface and may be quickly adjusted to conform to a level surface as all that is to be done is to properly manipulate the two shafts 45.

Having thus described the invention, I claim:

A hillside tractor comprising a relatively narrow elongated chassis, a single steering wheel at the front end of the chassis, means for setting said wheel from a seat on the chassis, a single driving wheel at the rear end of the chassis, a motor on the chassis between the ends thereof operatively connected with the driving wheel, a cross frame rigidly secured to and extending from the sides of the chassis in advance of the driving wheel, vertically movable rack bars mounted in the outer ends of the cross frame, caster wheels swiveled in the lower ends of the rack bars, transverse shafts mounted on the cross frame, pinions at the outer ends of said shafts meshing with the respectively adjacent rack bars, worm pinions at the inner ends of said shafts, longitudinal shafts journaled upon the cross frame and extending forwardly beyond the front of the same adjacent the opposite sides of the chassis, worms on the rear ends of said longitudinal shafts meshing with the respective worm pinions, and means at the front ends of said longitudinal shafts accessible from a seat on the chassis for rotating the said shafts whereby to maintain the level of the tractor.

In testimony whereof I affix my signature.

WALTER G. ROGERS. [L. S.]